United States Patent Office 3,246,309
Patented Apr. 12, 1966

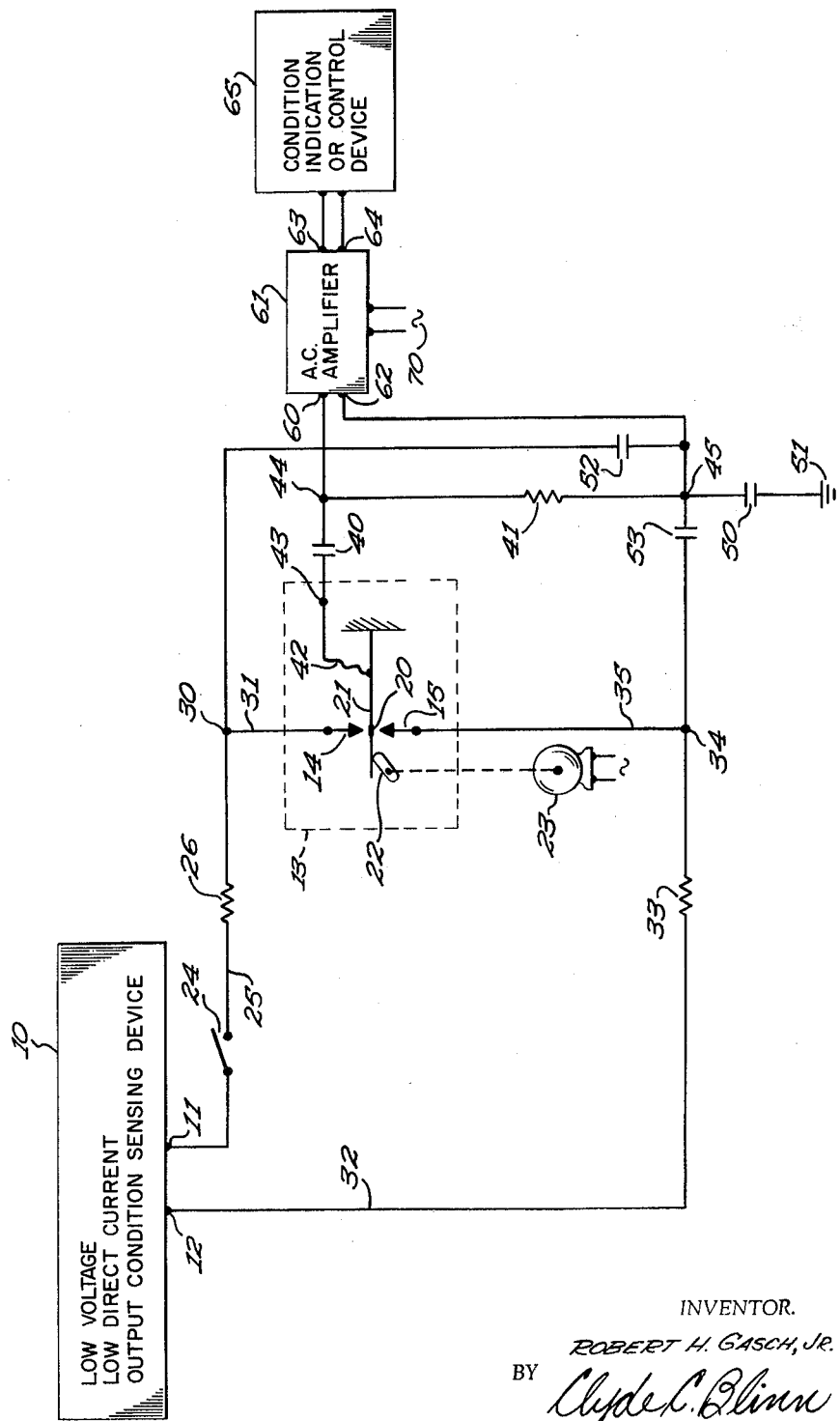

3,246,309
CONTROL AND INDICATION APPARATUS
Robert H. Gasch, Jr., Long Lake, Minn., assignor to Honeywell Inc., a corporation of Delaware
Filed Nov. 8, 1963, Ser. No. 322,469
2 Claims. (Cl. 340—213)

The present invention is concerned with an improvement in an electrical network circuit which amplifies a small D.C. voltage signal from a condition responsive means by converting the signal to an A.C. signal to be amplified by an A.C. amplifier to provide an A.C. output; in particular, a resistance-capacitance circuit is alternately charged and discharged by the voltage available from the sensor to provide the A.C. signal.

In electrical network circuits used with sensing devices having relatively small voltage outputs and very limited current outputs, the need for a relatively high resistance input circuit to convert a D.C. signal to A.C. so that a relatively inexpensive amplifier is provided has been shown. In such sensors, any large current drains often results in the damaging of the sensor. Such is particularily true when the sensor is first connected to a network circuit and the initial charging of various capacitors in the network circuit is accomplished.

In the present invention, the output of a low voltage low direct current sensor is fed through current limiting resistors to a switching device for alternately charging and discharging very low capacitance capacitor in a resistance-capacitance or RC circuit to provide an A.C. voltage which can be amplified for an output signal. In such a circuit, stray A.C. circulating currents are grounded for preventing the circulating currents from imposing an error by changing the magnitude of the input signal from the responsive device.

An object of the present invention is to provide voltage dividing network circuit having a switching device for alternately charging a capacitor from a low voltage D.C. source to provide an A.C. voltage signal output.

Another object of the present invention is to provide a network circuit with a switching device to alternately charge and discharge a condenser from a D.C. source having a low A.C. resistance path to ground to prevent errors due to circulating alternating currents.

These and other objects will become apparent upon the study of the following specification and drawing of which:

A single figure shows a schematic representation of the network circuit with a low voltage low current output sensing device.

Referring to the single figure, a condition sensing device 10 of a conventional type has a low voltage, low direct current output between terminals 11 and 12 which varies proportional to the level of the condition. Sensing device 10 might be any type of a voltage generating means which produces a D.C. voltage upon the change of a condition such as a pH indicator which has an electrode emersed in a tank of water to generate a D.C. voltage depending upon the pH level. Obviously, other types of sensors might be used and the present invention is not limited to any particular sensor.

A switching device or means 13 has a pair of contacts 14 and 15 which are alternately engaged by a movable contact 20 attached to a blade 21. Blade 21 is fixed at one end and is driven by an off center cam 22 at the predetermined rate or frequency depending upon the driving motor 23. Switching devices of the type disclosed as 13 are commonly known as vibrators or choppers and have various schemes for moving the blade 21 back and forth to switch the circuit at a fixed frequency.

The output terminal 11 of sensor 10 is connected to contact 14 through a circuit traced as follows: a switch 24, a conductor 25, a limiting resistor 26, a terminal 30, and a conductor 31. The other output terminal 12 is connected to contact 15 by a circuit traced as follows: a conductor 32, a limiting resistor 33, a terminal 34, and a conductor 35 to contact 15.

A circuit comprising a very small capacitor 40 and a high resistance 41 is connected between movable contact 20 and ground through a circuit traced as follows: a flexible lead 42 connecting blade 21 to terminal 43, capacitor 40, a terminal 44, resistor 41, a terminal 45, a capacitor 50, to a ground 51. Connected between terminals 30 and 45 is a capacitor 52, and connected between terminals 34 and 45 is a capacitor 53.

An A.C. voltage available at terminal 44 as capacitor 40 charges in one direction or the other upon the operation of switching device 13 is connected to the input terminal 60 of an A.C. amplifier 61 which has an input terminal 62 ground through capacitor 50. Amplifier 61 is of a conventional type such as the amplifier shown on page 931 of the Measurement Section of Terman's Radio Engineers Handbook 1943 (McGraw-Hill). A.C. amplifiers of this type are relatively inexpensive and have very little drift. A D.C. amplifier to amplify the signal or sensor 10 directly would be relatively expensive to obtain equal results. An output signal available between terminals 63 and 64 of amplifier 61 is connected to a condition indication and/or control device 65.

*Operation*

Upon the application of power to amplifier 61 and motor 23, switch 24 can be closed to connect the output of sensing device 10 to the network circuit. The voltage available from sensor 10 is relatively small and generally devices of this type produce only a small amount of current. Excessive current drains from the sensing device by a low resistance between the output terminals can often cause damage to the device. When switch 24 is closed, the initial surge of current to charge capacitors 52 and 53 might be relatively large; therefore, limited resistors 26 and 33 are used to prevent this initial current drain on sensing device 10. After normal operation is established, the resistance of resistors 26 and 33 is small enough to not make any difference in the normal operation.

As the movable blade 21 moves upward and contact 20 engages contact 14, a voltage dividing network circuit is established for charging capacitor 40 through a circuit traced as follows: from terminal 11, switch 24, resistor 26, contacts 14–20, terminal 43, capacitor 40, resistor 41, capacitor 53, resistor 33, and back to the other output terminal 12. Capacitor 40 is fast to charge since the capacitor is relatively small. When blade 21 then moves downward to have contact 20 engage contact 15, the voltage on capacitor 40 is dissipated by a current circulating around the path through capacitor 53 and at the same time, capacitor 40 charges in the opposite direction from the voltage of sensor 10 through a circuit traced as follows: from output terminal 12, resistor 33, contacts 15–20, output terminal 43, capacitor 40, terminal 44, resistor 41, capacitor 52 resistor 26, and back to the other side 11 of the source of power. A similar discharge circuit for capacitor 40 is established through capacitor 52 subsequently when contact 20 again engages contact 14.

An explanation of the charging circuit is best made by considering capacitors 52 and 53 to be connected in series across a power source 10 at terminals 11 and 12. One side of capacitor 40 is connected between capacitors 52 and 53. By means of chopper 13, capacitor 40 is first connected in parallel with capacitor 52 and then capacitor 53 to alternately connect capacitor 40 in two different places in the voltage dividing circuit energized by device 10.

By the alternately charging of capacitor 40 in one direction or the other by the voltage from sensor 10, an A.C. voltage at terminal 14 is available to be amplified by the conventional amplifier 61 to provide a signal for device 65 indicative by the level of the condition as sensed by sensor 10.

By means of capacitor 50, a low resistance path to ground for any A.C. current circulating through the network circuit is provided. In a network circuit of this type where the input signal available is of a very low voltage and sensor 10 may be grounded in some manner, a considerable error can be introduced into the system by stray A.C. currents. An A.C. current migrating from the power supply 70 of amplifier 61 might provide various voltage drops throughout the network circuit. These voltage drops can be added to the input signal to vary the charging voltage of capacitor 40 to result in an erroneous signal. The A.C. current flowing from amplifier 61 through switching device 13 has a low resistance path to ground and is not in any way added to the input signal available between terminals 11 and 12.

While the invention has been described in one particular manner, the intent is to limit the present invention only by the scope of the appended claims, in which I claim:

1. In an electrical network circuit,
condition responsive means providing a low voltage low current direct current output having a voltage magnitude between two output terminals depending upon a magnitude of a condition,
a switching device having a first contact alternately contacting two contacts, said first contact being operated at a fixed frequency,
a pair of current limiting resistances,
circuit means including one of said resistances for separately connecting said output terminals to said fixed contacts,
a small capacitor, a terminal, a high resistance, an electrical ground, a bypass capacitor,
circuit means connecting said small capacitor, said terminal, said high resistance, said bypass capacitor in a series circuit between said first contact and said ground in the order named,
two capacitors,
circuit means connecting one of each of said two capacitors to one of said two contacts and ground through said bypass capacitor,
A.C. voltage amplifying means having an input terminal and second output terminals,
circuit means connecting said terminal to said input terminal whereby upon an A.C. voltage being provided by alternately charging said small capacitor from said condition responsive means, and
further means connected to said second output terminals to be energized indicative of said condition.

2. In an electrical network circuit,
condition responsive means providing a low voltage low current direct current output having a voltage magnitude between two output terminals depending upon a magnitude of a condition,
a switching device having a first and second circuit alternately closed, said circuits being closed at a fixed frequency,
circuit means for separately connecting said output terminals to said circuits,
a capacitor, a terminal, a resistance, an electrical ground,
circuit means connecting said capacitor, said terminal, said resistance, in a series circuit with said first and second circuits to said ground in the order named,
first and second capacitors,
circuit means connecting said first capacitor between one of said output terminals and ground and said second capacitor between another of said output terminals and ground,
voltage amplifying means having an input terminal and an output,
further means adapted to be energized and connected to said output, and
circuit means connecting said terminal to said input terminal whereby upon an A.C. voltage being provided by alternately charging said capacitor from said condition responsive means said further means is energized indicative of said condition.

References Cited by the Examiner
UNITED STATES PATENTS

| | | | |
|---|---|---|---|
| 2,485,948 | 10/1948 | Williams et al. | 321—49 X |
| 2,622,192 | 12/1952 | Tarpley | 321—49 X |
| 2,677,093 | 4/1954 | Maltby | 321—49 |
| 2,677,095 | 4/1954 | Maltby et al. | 321—49 |
| 2,891,220 | 6/1959 | Wannamaker | 321—49 X |
| 2,998,562 | 8/1961 | Petzelt | 321—49 |

NEIL C. READ, *Primary Examiner.*

R. M. ANGUS, *Assistant Examiner.*